Figure 1:
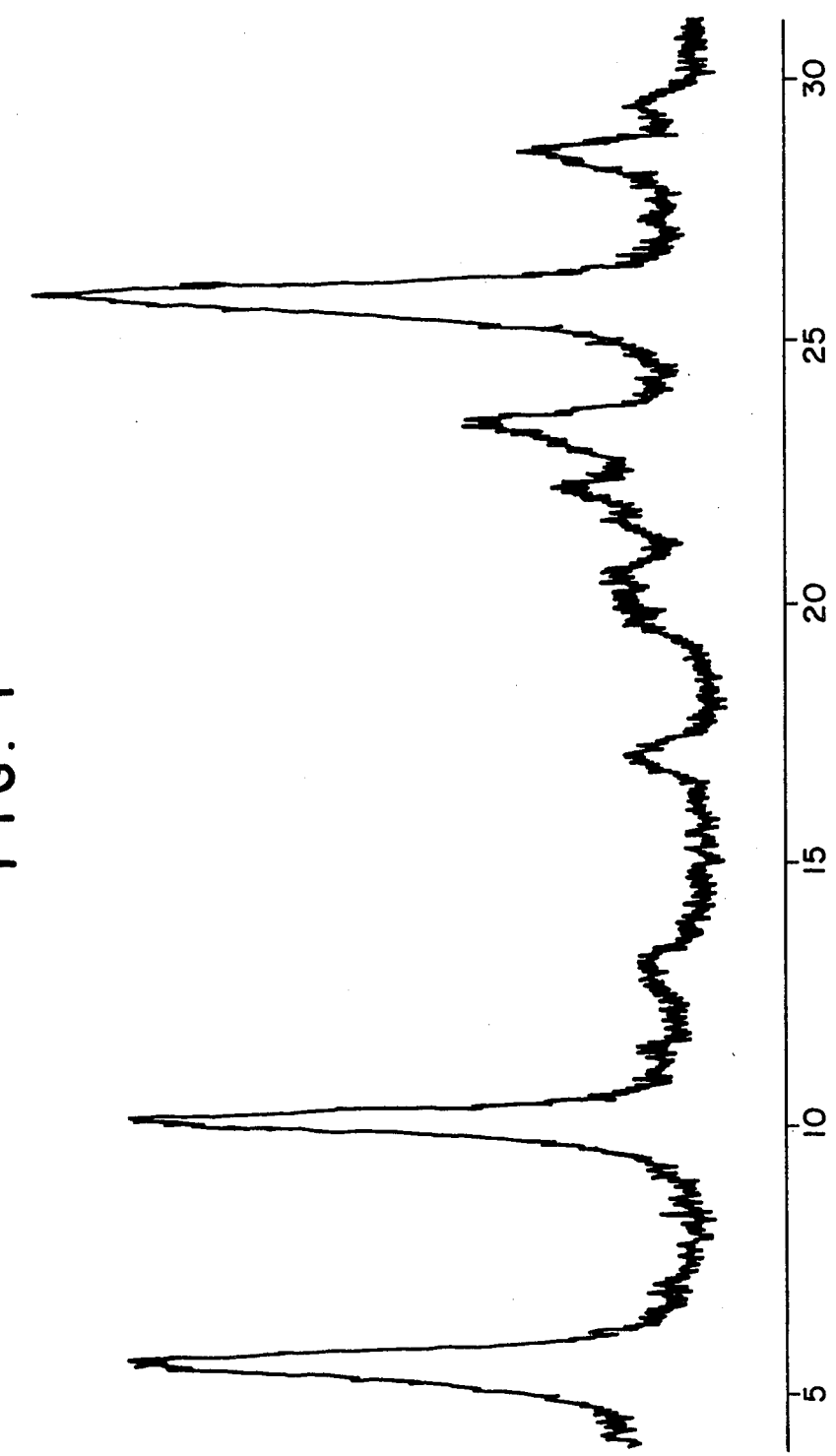

United States Patent [19]

Sakaguchi et al.

[11] Patent Number: 4,481,358

[45] Date of Patent: Nov. 6, 1984

[54] PROCESS FOR PRODUCING DIOXAZINE VIOLET PIGMENT

[75] Inventors: Iwao Sakaguchi; Yoshiaki Hayashi, both of Toyonaka, Japan

[73] Assignee: Sumitomo Chemical Company, Limited, Osaka, Japan

[21] Appl. No.: 360,771

[22] Filed: Mar. 22, 1982

[30] Foreign Application Priority Data

Apr. 10, 1981 [JP] Japan ................................ 56-54855
Apr. 10, 1981 [JP] Japan ................................ 56-54856

[51] Int. Cl.³ .................... C07D 265/34; C09B 19/00; C09B 19/02; D06P 1/00
[52] U.S. Cl. ................................ 544/99; 106/288 Q; 106/308 Q; 106/309
[58] Field of Search ............... 106/288 Q, 308 Q, 309; 544/99

[56] References Cited

U.S. PATENT DOCUMENTS

| | | | |
|---|---|---|---|
| 3,022,298 | 2/1962 | Mory et al. | 106/288 Q X |
| 3,119,706 | 1/1964 | Bachmann | 106/309 |
| 3,130,195 | 4/1964 | Vor DerCrone et al. | 106/288 Q X |
| 3,310,556 | 3/1967 | Vor DerCrone et al. | 106/288 Q X |
| 3,577,255 | 5/1971 | Petke | 106/308 |
| 4,345,074 | 8/1982 | Hufnagel et al. | 544/99 |

FOREIGN PATENT DOCUMENTS

| | | |
|---|---|---|
| 16786 | 8/1964 | Japan . |
| 32179 | 10/1973 | Japan . |
| 935 | 1/1977 | Japan . |
| 32548 | 4/1981 | Japan . |

*Primary Examiner*—Floyd D. Higel
*Attorney, Agent, or Firm*—Cushman, Darby & Cushman

[57] ABSTRACT

A process for producing stable ($\beta$-type) dioxazine violet pigment having superior gloss and tinting strength to the metastable ($\alpha$-type or a type analogous thereto) dioxazine violet pigment, by mixing an aqueous suspension of a metastable dioxazine violet pigment with an acetate or ketone compound and then heating the mixture. The metastable dioxazine violet pigment may be that obtained according to the conventional method, and employable in situ.

13 Claims, 3 Drawing Figures

PROCESS FOR PRODUCING DIOXAZINE VIOLET PIGMENT

The present invention relates to a process for producing a dioxazine violet pigment.

As to the pigmentation of crude dioxazine violet (Color Index, Pigment Violet 23), there have heretofore been known a wet or dry pulverization method wherein the crude dioxazine violet is treated by means of kneader or ball mill using a large amount of inorganic salts or balls, respectively; an acid slurry method by use of 60 to 90 % sulfuric acid (Japanese published examined patent application No. 16786/1964); a slurry method by use of an aromatic sulfonic acid (West German Pat. No. 946,560); a paste method by use of halogenated acetic acid (Japanese published unexamined patent application No. 935/1977), and so on.

In these known methods, however, various problems remain unsolved. For example, according to the pulverization method, a large amount of inorganic salts or balls must be used, and therefore the amount per batch of the fed crude material is inevitably decreased, so that the productivity is lowered, and moreover it is necessary to recover the used inorganic salts after the pigmentation.

According to the acid slurry method, the concentration of sulfuric acid and the temperature at which the treatment is carried out must be controlled exactly. Even when they are controlled well, the resulting pigment has, as described in Japanese published examined patent application No. 32179/1973, a metastable α-type crystal form (the characteristics are found in 5.8°, 10.2° and 24.4° at $2\theta$ (Cu $K_\alpha\lambda = 1.5418$ Å) in the diffraction angle, and this crystal form is hereinafter referred to as α-form), which is higher in the energy level, more sensitive to bring about the crystal transformation and inferior in a migration resistance or the like, as compared with a stable form (the characteristics are found in 5.7°, 10.2°, 17.1°, 23.4° and 28.6° at $2\theta$ (Cu $K_\alpha\lambda = 1.5418$ Å) in the diffraction angle, and this crystal form is hereinafter referred to as β-form). According to the slurry method and the paste method, chemicals to be used are expensive and difficult to be recovered after the pigmentation. Particularly in the paste method, the resulting pigment has found not to be the β-form but rather an α-form analogue (the characteristics are found in 9.6°, 10°, 23.5° and 26.7° at $2\theta$ (Cu $K_\alpha\lambda = 1.5418$ Å) in the diffraction angle).

The present inventors have previously studied to develop an effective process for pigmentation to obtain a stable β-form dioxazine violet pigment from the crude one, and as a result, found that the stable β-form pigment can be produced by heat-treating a mixture comprising an aqueous suspension of dioxazine violet pigment of α-form or a crystal form analogous thereto and an aromatic compound having a low solubility in water.

The inventors have earnestly continued the studies to obtain further excellent pigments, and found that a stable, fine β-form pigment can be obtained by heat-treating a mixture comprising an aqueous suspension of pigment of α-form or a crystal form analogous thereto and an acetate compound or a ketone of aliphatic or alicyclic compound having 4 to 11 carbons.

Figure 2:
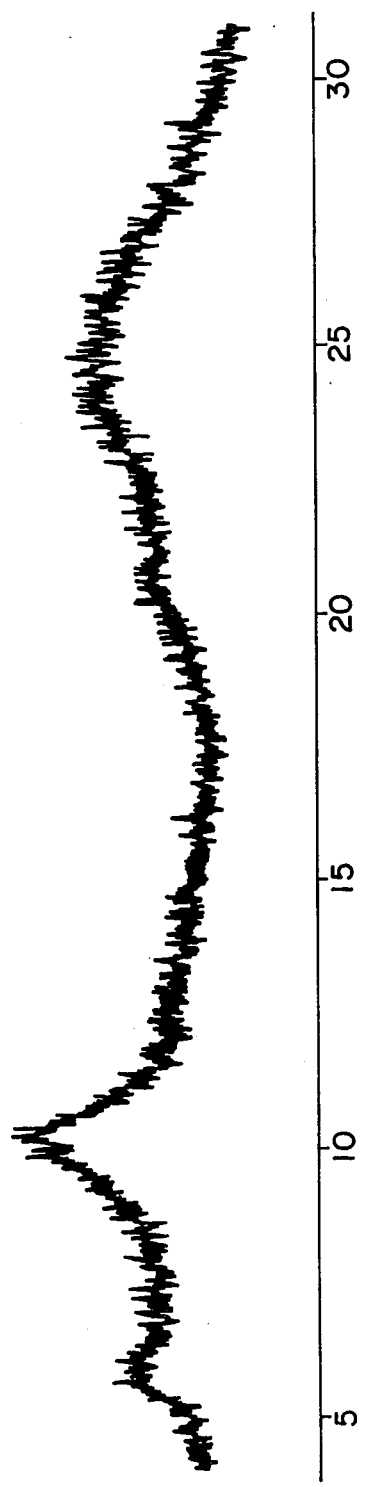
Figure 3:
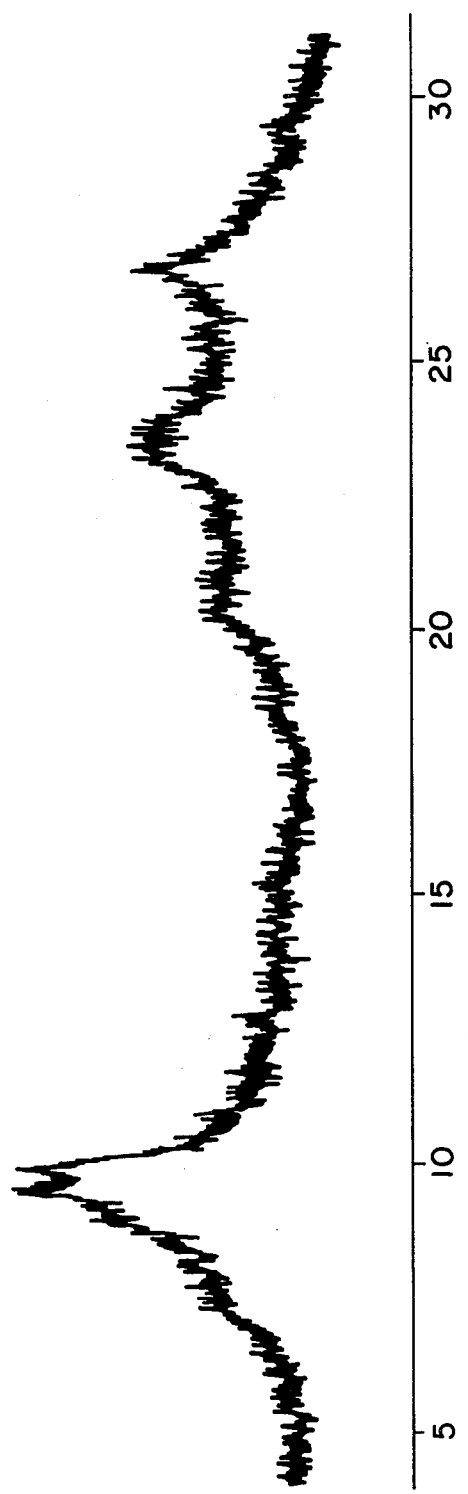

In the accompanying drawings:

FIG. 1 shows the X-ray diffraction diagram of the β-form pigment obtained in the Example 1 of the present invention, FIG. 2 shows that of the α-form pigment obtained in the Reference Example 1, and FIG. 3 shows that of a pigment analogous to α-form obtained in the Reference Example 3, all examples and reference examples being referred to below.

The present invention provides a process to produce a stable form dioxazine violet pigment, which comprises mixing an aqueous suspension of a metastable dioxazine violet pigment with an acetate compound or an aliphatic or alicyclic ketone of 4 to 11 carbons, and then heating the mixture.

In this invention, a metastable dioxazine violet pigment refers to a pigment of α-form or a crystal form analogous thereto, which may be obtained by a method, for example, disclosed in the Japanese published examined patent application No. 16786/1964 or Japanese published unexamined patent application No. 935/1977.

The process described in the Japanese published examined patent application No. 16786/1964 comprises sulfonating an aromatic hydrocarbon in concentrated sulfuric acid, subsequently adjusting the concentration of sulfuric acid to 60 to 90%, adding crude dioxazine violet thereto, heating the resulting mixture while stirring to obtain the sulfate, hydrolyzing the sulfate and then separating the desired pigment from the aqueous mixture thereof. Thus obtained pigment is of α-form as shown in FIG. 2. Further, a pigment obtained through the above procedure, provided that a slurry is formed in 60 to 90% sulfuric acid without use of benzenoid hydrocarbon, is also of α-form and usable in the present invention as the starting material.

Or, the process described in the Japanese published unexamined patent application No. 935/1977 comprises dissolving the crude dioxazine violet in a halogenated acetic acid and then subjecting the solution to recrystallization using water or a water-soluble solvent. Thus obtained pigment is not of β-form, but a crystal form analogous to the α-form as shown in FIG. 3.

In this invention, as an acetate compound, an ester compound with an aliphatic or alicyclic alcohol is preferable, which may include, for example, the following: methyl acetate, ethyl acetate, n-propyl acetate, isopropyl acetate, n-butyl acetate, isobutyl acetate, sec-butyl acetate, n-amyl acetate, γ-methoxybutyl acetate, methylamyl acetate, β-ethylbutyl acetate, β-ethylhexyl acetate, cyclohexyl acetate, methylcyclohexyl acetate, and nonyl acetate, in which the one most preferably used is n-butyl acetate.

In this invention, an aliphatic ketone or alicyclic ketone of 4 to 11 carbons, or preferably 4 to 7 carbons, may, for example, include the following compounds: methyl ethyl ketone, methyl n-propyl ketone, methyl n-butyl ketone, diethyl ketone, methyl isobutyl ketone, methyl n-amyl ketone, ethyl butyl ketone, methyl hexyl ketone, diisobutyl ketone, cyclohexanon, 4-methylcyclohexanon, and 3-methylcyclohexanon, in which the one most preferably used is methyl isobutyl ketone.

The charging amount of the compound may be 0.1 to 5.0 times, preferably 0.5 to 2.0 times, the weight of the pigment.

The temperature of heat-treatment, seeing that the effect is accelerated at higher temperature, may be preferably conform to the azeotropic point of the water and the solvent to be used, and it is usually not higher than 100° C. under the normal pressure. Or, under increased pressure, it is also possible to treat at a temperature higher than 100° C. The heat-treating period of time is usually within a range of one hour to more than ten hours, but the treatment may end in one to eight hours when the conditions are selected properly.

In working of the present invention, an acetate compound or a ketone compound is added to an aqueous suspension of the metastable dioxazine pigment obtained according to the processes as mentioned above, and the mixture is heat-treated. The water to be used may be 5 to 20 times, or preferably 8 to 12 times, of the weight of the starting pigment. Or, in an industrially advantageous process, the metastable dioxazine pigment may be, after being produced in the said process, directly neutralized with an alkali without being isolated, and an acetate compound or a ketone compound may be added to be heat-treated.

After the heat-treatment, the desired pigment may be isolated from the acetate or ketone compound by, for example, steam distillation or azeotropic distillation advantageously so that the compound may be recovered and reused.

The pigment thus obtained is neither of α-form nor a crystal form analogous thereto before the treatment of the present invention, but is of β-form as shown in FIG. 1, which is equal to that of the pigment obtained by the aforesaid conventional pulverization method.

The β-form dioxazine violet pigment thus obtained is markedly superior in tinting strength, gloss, dispersibility and other properties to the metastable type pigment. In accordance with the present invention, the dioxazine violet pigment free from the problem in respect of migration resistance and stable in the crystal form and the quality can be easily produced under widely selectable conditions without troublesome operations such as exact control of the concentration of sulfuric acid and the temperature at which the pigmentation is carried out as seen in the aforesaid slurry method.

Or, as compared with the heating method by adding an aromatic compound of a low solubility in water stated above, the particle size of the β-form pigment obtained in the process of the present invention is extremly smaller, and its hue has a markedly red color and the tinting strength is higher by 10 to 30%. Thus extremely preferable qualities are obtained.

The pigment thus obtained in the present invention is used in coloring plastics (e.g. polyvinyl chloride, polyolefin, polystyrene, rubber), inks (e.g. gravure inks, flexographic inks, offset inks), or paints (e.g. aminoalkyd paints, air drying alkyd paints, thermosetting acrylic paints).

The present invention is explained in more details with reference to Reference Examples and Examples. In the examples, parts refer to parts by weight.

REFERENCE EXAMPLE 1

[Synthesis of metastable dioxazine violet pigment 1]

Twenty parts of crude dioxazine violet (C.I. Pigment Violet 23) was added to 300 parts of 78% sulfuric acid, and the resulting mixture was stirred at 50° C. for 5 hours, and then poured into 3000 parts of water. The product was then separated by filtration, washed with water and then dried to obtain 19.6 parts of α-form dioxazine violet pigment. The X-ray diffraction thereof was as shown in FIG. 2.

REFERENCE EXAMPLE 2

[Synthesis of metastable dioxazine violet pigment 2]

To 200 parts of 95% sulfuric acid was added 40 parts of toluene, and the mixture was stirred at 40° C. for an hour. After the toluene and sulfuric acid formed a single layer, 31.3 parts of water was gradually added dropwise thereto to adjust the concentration of sulfuric acid to 85%. Twenty parts of crude dioxazine violet was added thereto and the resulting mixture was stirred at room temperature for 4 hours, and then poured into 2000 parts of water. The product was separated by filtration, washed with water and then dried to obtain 19.6 parts of the same α-form pigment as that in Reference Example 1.

REFERENCE EXAMPLE 3

[Synthesis of metastable dioxazine violet pigment 3]

Ten parts of crude dioxazine violet was added to 80 parts of dichloroacetic acid, and the mixture was stirred at 50° C. for 2 hours to form a solution and then poured into 500 parts of methanol. The product was separated by filtration, washed with water and then dried to obtain 9.8 parts of pigment having a crystal form analogous to α-form. The X-ray diffraction thereof was as shown in FIG. 3.

EXAMPLE 1

Ten parts of α-form pigment obtained in Reference Example 1 was suspended in 150 parts of water, and 10 parts of n-butyl acetate was added, then the mixture was stirred at 90° to 91° C. for 5 hours. Successively, n-butyl acetate was removed by azeotropic distillation, and the product was separated by filtration, washed with water and then dried to obtain 9.8 parts of β-form dioxazine violet pigment. The X-ray diffraction thereof was as shown in FIG. 1.

When used for an amino-alkyd paint, this pigment was superior in gloss and tinting strength by 20% to the α-form pigment obtained in Reference Example 1.

Or, when compared with the pigment obtained by using benzoic acid instead of n-butyl acetate, the hue was notably reddish and the tinting strength was 15% higher.

EXAMPLES 2 to 7

Ten parts of α-form pigment obtained in Reference Example 2 was suspended in 200 parts of water, and the mixture was treated under the following conditions, whereby β-form pigments similar to that of Example 1 were obtained.

| Example No. | Ester compound added (parts) | | Treating temperature (°C.) | Treating time (hrs) |
| --- | --- | --- | --- | --- |
| 2 | n-Amyl acetate | 5 | 93–95 | 4 |
| 3 | Ethyl acetate | 20 | 80–82 | 12 |
| 4 | Isobutyl acetate | 5 | 92–93 | 7 |
| 5 | n-Propyl acetate | 10 | 90–92 | 5 |
| 6 | Cyclohexyl acetate | 6 | 87–88 | 10 |
| 7 | Nonyl acetate | 3 | 95–96 | 3 |

EXAMPLE 8

Eight parts of the pigment having a crystal form analogous to α-form obtained in Reference Example 3 was suspended in 80 parts of water, and 4 parts of n-butyl acetate was added, then the mixture was stirred in an autoclave at 115° to 120° C. for 2 hours. Successively, n-butyl acetate was removed by steam distillation, and the product was separated by filtration, washed with water and then dried. Thus, 7.5 parts of β-form pigment similar to that of Example 1 was obtained.

EXAMPLE 9

To 300 parts of 82% sulfuric acid was added 15 parts of crude dioxazine violet, and the mixture was stirred at the room temperature for 4 hours. Thereafter, 1000 parts of 20% caustic solution was added dropwise thereto while cooling the mixture, whereby the pH was adjusted to 7.0. Then 4 parts of n-butyl acetate was added and the mixture was stirred at 100° to 105° C. for 5 hours to adjust the pH to 8.0. The product was then separated by filtration, washed with water, dried, and 14 parts of β-form pigment similar to that of Example 1 was obtained.

When used for coloring a polyvinyl chloride resin, this pigment was superior in dispersibility and tinting strength by 25% to the α-form pigment obtained in Reference Example 1.

EXAMPLE 10

Ten parts of α-form pigment obtained in Reference Example 1 was suspensed in 150 parts of water, and 10 parts of methyl isobutyl ketone was added, then the mixture was stirred at 87° to 88° C. for 5 hours. By blowing steam in, the methyl isobutyl ketone was removed, and the product was separated by filtration, washed with water, and dried, then 9.8 parts of β-form dioxazine violet pigment was obtained. The X-ray diffraction thereof was as shown in FIG. 1.

When used for an amino-alkyd paint, this pigment was superior in gloss and tinting strength by 20% to the α-form pigment obtained in Reference Example 1.

Or, when compared with the pigment obtained by using benzoic acid instead of methyl isobutyl ketone, the hue was notably reddish and the tinting strength was 15% higher.

EXAMPLES 11 to 14

Ten parts of α-form pigment obtained in Reference Example 2 was suspended in 200 parts of water, and the mixture was treated under the following conditions, whereby β-form pigments similar to that of Example 10 were obtained.

| Example No. | Ketone compound added (parts) | | Treating temperature (°C.) | Treating time (hrs) |
| --- | --- | --- | --- | --- |
| 11 | Diethyl ketone | 15 | 93–94 | 10 |
| 12 | Methyl ethyl ketone | 20 | 90–91 | 6 |
| 13 | Ethyl amyl ketone | 5 | 91–92 | 7 |
| 14 | Cyclohexanon | 8 | 94–95 | 5 |

EXAMPLE 15

Eight parts of the pigment having a crystal form analogous to α-form obtained in Reference Example 3 was suspended in 80 parts of water, and 3 parts of methyl isobutyl ketone was added. Then, the mixture was stirred in an autoclave at 115° to 120° C. for 2 hours. Successively, the methyl isobutyl ketone was removed by steam distillation, and the product was separated by filtration, washed with water and then dried. Thus, 7.5 parts of β-form pigment similar to that of Example 10 was obtained.

EXAMPLE 16

To 300 parts of 82% sulfuric acid was added 15 parts of crude dioxazine violet, and the mixture was stirred at the room temperature for 4 hours. Thereafter, 1000 parts of 20% caustic solution was added dropwise thereto while cooling the mixture, whereby the pH was adjusted to 7.0. Then 15 parts of methyl isobutyl ketone was added thereto and the mixture was stirred at 90° to 91° C. for 5 hours. Successively, the methyl isobutyl ketone was removed by azeotropic distillation, and the product was separated by filtration, washed with water and dried, then 14 parts of β-form pigment similar to that of Example 10 was obtained.

When used for coloring a polyvinyl chloride resin, this pigment was superior in dispersibility and tinting strength by 25% to the α-form pigment obtained in Reference Example 1.

We claim:

1. A process for the crystal transformation of dioxazine violet pigment, comprising suspending a metastable dioxazine violet pigment having the type crystal form characteristic in 5.8°, 10.2° and 24.4° at 2θ in the diffraction angle in water mixed with (1) an acetate of an aliphatic or alicyclic alcohol or (2) an aliphatic or alicyclic ketone having 4 to 11 carbons, and heating until a stable dioxazine violet pigment having the β type crystal form characteristic in 5.7°, 10.2°, 17.1°, 23.4° and 28.6° at 2θ in the diffraction angle is obtained.

2. The process according to claim 1, wherein the metastable dioxazine violet pigment is obtained by mixing crude dioxazine violet with 60 to 90% sulfuric acid to form the sulfate, and then hydrolyzing the said sulfate.

3. The process according to claim 1, wherein the metastable dioxazine violet pigment is obtained by sulfonating an aromatic hydrocarbon in concentrated sulfuric acid, successively adjusting the concentration of the sulfuric acid to 60 to 90%, then adding crude dioxazine violet thereto to form the sulfate, and hydrolyzing the said sulfate.

4. The process according to claim 1, wherein the metastable dioxazine violet pigment is obtained by dissolving crude dioxazine violet in a halogenated acetic acid, and then subjecting the solution to recrystallization with water or a water-soluble solvent.

5. The process according to claim 1, wherein there is used methyl isobutyl ketone.

6. The process according to claim 1, wherein there is used n-butyl acetate.

7. The process according to claim 1, wherein the mixing amount of the acetate or aliphatic or alicyclic ketone of 4 to 11 carbons is 0.1 to 5.0 times the weight of the starting pigment.

8. The process according to claim 7, wherein the amount of water being used is 5 to 20 times the weight of the starting pigment.

9. The process according to claim 1, wherein the amount of water being used is 5 to 20 times the weight of the starting pigment.

10. The process according to claim 1, wherein the heat treatment is carried out under the normal pressure and at a temperature of not higher than 100° C.

11. A process according to claim 1 wherein there is mixed with the metastable dioxazine violet pigment a compound which is methyl acetate, ethyl acetate, n-propyl acetate, isopropyl acetate, n-butyl acetate, isobutyl acetate, sec-butyl acetate, n-amyl acetate, γ-methoxybutyl acetate, methylamyl acetate, β-ethylbutyl acetate, β-ethylhexyl acetate, cyclohexyl acetate, methylcyclohexyl acetate, nonyl acetate, methyl ethyl ketone, methyl n-propyl ketone, methyl n-butyl ketone, diethyl ketone, methyl isobutyl ketone, methyl n-amyl ketone, ethyl butyl ketone, methyl hexyl ketone, diisobutyl ketone, cyclohexanon, 4-methylcyclohexanon, or 3-methylcyclohexanon.

12. A process according to claim 1 wherein the aqueous suspension of the metastable dioxazine violet pigment which is mixed with the acetate or ketone contains water as the sole liquid.

13. A process according to claim 12 wherein the aqueous suspension employed consists essentially of the metastable dioxazine violet pigment and water.

* * * * *